United States Patent
Carlson (10) Patent No.: US 11,568,885 B1
(45) Date of Patent: Jan. 31, 2023

(54) MESSAGE AND USER PROFILE INDICATIONS IN SPEECH-BASED SYSTEMS

(71) Applicant: Amazon Technologies, Inc., Seattle, WA (US)

(72) Inventor: Ty Loren Carlson, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 70 days.

(21) Appl. No.: 16/277,837

(22) Filed: Feb. 15, 2019

Related U.S. Application Data (63) Continuation of application No. 14/282,821, filed on May 20, 2014, now Pat. No. 10,210,885.

(51) Int. Cl.
| | | |
|---|---|---|
| *G10L 21/10* | (2013.01) | |
| *G06F 15/16* | (2006.01) | |
| *G06F 9/54* | (2006.01) | |

(52) U.S. Cl.
CPC .............. *G10L 21/10* (2013.01); *G06F 9/546* (2013.01); *G06F 15/16* (2013.01)

(58) Field of Classification Search
CPC ......... G10L 17/00; G10L 25/54; G10L 15/22; G10L 15/26; G10L 15/265
See application file for complete search history.

(56) References Cited

U.S. PATENT DOCUMENTS

| | | |
|---|---|---|
| 6,498,835 B1 | 12/2002 | Skladman et al. |
| 7,418,392 B1 | 8/2008 | Mozer et al. |
| 7,720,683 B1 | 5/2010 | Vermeulen et al. |
| 7,774,204 B2 | 8/2010 | Mozer et al. |
| 8,355,912 B1 | 1/2013 | Keesey et al. |
| 2003/0126195 A1* | 7/2003 | Reynolds .................. G06F 1/14 709/203 |

(Continued)

FOREIGN PATENT DOCUMENTS

| | | |
|---|---|---|
| WO | WO2009138903 | 11/2009 |
| WO | WO2011088053 A2 | 7/2011 |

OTHER PUBLICATIONS

Scott, David. "Suggestions for Layout and Functional Behavior of Software-Based Voice Switch Keysets." SpaceOps 2010 Conference Delivering on the Dream Hosted by NASA Marshall Space Flight Center and Organized by AIAA. 2010.*

(Continued)

*Primary Examiner* — Paras D Shah
(74) *Attorney, Agent, or Firm* — Lee & Hayes, P.C.

(57) ABSTRACT

A speech-based system utilizes a speech interface device located in the home of a user. The system may interact with different users based on different user profiles. The system may include messaging services that generate and/or provide messages to the user through the speech interface device. The speech interface device may have indicators that are capable of being illuminated in different colors. To notify a user regarding the currently active user profile, each user profile is associated with a different color and the color of the active profile is displayed on the speech interface device when the user is interacting with the system. To notify the user regarding awaiting messages, different types of messages are associated with different colors and the colors of the message types of waiting messages are displayed on the speech interface whenever the user is not interacting with the system.

20 Claims, 5 Drawing Sheets

(56) References Cited

U.S. PATENT DOCUMENTS

| | | |
|---|---|---|
| 2005/0060148 A1 | 3/2005 | Masuda et al. |
| 2008/0016555 A1 | 1/2008 | Krane |
| 2009/0191848 A1 | 7/2009 | Helferich |
| 2010/0131443 A1* | 5/2010 | Agarwal .................. G06N 5/02 706/46 |
| 2010/0169091 A1* | 7/2010 | Zurek .................... G06Q 30/02 704/235 |
| 2010/0216489 A1 | 8/2010 | Green et al. |
| 2011/0124367 A1 | 5/2011 | Hull et al. |
| 2011/0202956 A1 | 8/2011 | Connelly et al. |
| 2011/0208524 A1* | 8/2011 | Haughay ................ G10L 15/22 704/246 |
| 2011/0212736 A1 | 9/2011 | Jaime et al. |
| 2012/0047214 A1 | 2/2012 | Daly et al. |
| 2012/0159327 A1* | 6/2012 | Law ................ H04N 21/47217 715/716 |
| 2012/0223885 A1 | 9/2012 | Perez |
| 2013/0077772 A1 | 3/2013 | Lichorowic et al. |
| 2013/0100017 A1* | 4/2013 | Papakipos ............. G06F 1/1694 345/158 |
| 2014/0172995 A1* | 6/2014 | Deeter .................... H04L 51/12 709/206 |
| 2014/0210702 A1 | 7/2014 | Peterson et al. |
| 2014/0245178 A1 | 8/2014 | Smith |
| 2015/0169336 A1* | 6/2015 | Harper .................. G10L 15/22 715/706 |
| 2015/0256685 A1 | 9/2015 | Amberden |

OTHER PUBLICATIONS

Blackberry, "Flashing LED color descriptions", Retrieved from <<http://docs.blackberry.com/en/smartphone_users/delverables/48593/1571290.html>>, Jun. 2013, 1 page.

"Flashing LED color descriptions", retreived from <<http://docs.blackberry.com/en.smartphone_users/delierables/48593/1571290.html>>, archived in Jun. 2013, 1 page.

Office action for U.S. Appl. No. 14/282,821, dated Feb. 16, 2017, Carlson, "Message and User Profile Indications in Speech-Based Systems", 18 pages.

Office action for U.S. Appl. No. 14/282,821, dated Mar. 10, 2016, Carlson, "Message and User Profile Indications in Speech-Based Systems", 20 pages.

Office Action for U.S. Appl. No. 14/282,821, dated Mar. 8, 2018, Carlson, "Message and User Profile Indications in Speech-Based Systems", 20 pages.

Office action for U.S. Appl. No. 14/282,821, dated Aug. 12, 2015, Carlson, "Message and User Profile Indications in Speech-Based Systems", 15 pages.

Office action for U.S. Appl. No. 14/282,821, dated Aug. 8, 2017, Carlson, "Message and User Profile Indications in Speech-Based Systems", 22 pages.

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

MESSAGE AND USER PROFILE INDICATIONS IN SPEECH-BASED SYSTEMS

CROSS REFERENCE TO RELATED APPLICATION

This application is a continuation of co-pending, commonly owned U.S. patent application Ser. No. 14/282,821, filed May 20, 2014, and entitled "MESSAGE AND USER PROFILE INDICATIONS IN SPEECH-BASED SYSTEMS," the entirety of which is herein incorporated by reference.

BACKGROUND

As the processing power available to devices and associated support services continues to increase, it has become practical to interact with users through speech. For example, various types of devices may generate speech or render other types of audio content for a user, and the user may provide commands and other input by speaking.

Speech-based systems may provide various services to users. Some systems, for example, may provide messaging services. Messages may be from various senders and/or entities.

When interacting with a user, a speech-based system may utilize a user profile containing information regarding the user. For example, the user profile may indicate user preferences, configurations, settings, resources, accounts, and so forth. Commands received from the user may be interpreted and acted upon in light of the user profile corresponding to the currently active user. When different users use the system, the system may activate one of multiple profiles, depending on the identity of the current user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

A speech-based system may include a speech interface device and associated network-based services that work together to interact with users by speech and to provide services in response to user interactions. The network-based services may include a speech interaction service that interacts with system users through the speech interface device, which is located in premises of the users. The speech interaction service may be configured to interact with each user in accordance with a corresponding user profile that contains various types of information relating to the user. Services may be dependent upon and/or customized in light of the currently active user profile. A user profile may include user settings, characteristics, histories, accounts, authorizations, preferences, configurations, and so forth.

The network-based services may also include a messaging service that generates, receives, and/or stores messages for retrieval by users using the speech interface device. The messages may be of different categories or types. For example, messages may be categorized by origin, by subject, by priority, and so forth.

The network-based services may also include notification services configured to provide visual indications on the speech interface device regarding status and conditions relating to the system. The speech interface device may have multiple visual indicators for signaling status and conditions. The visual indicators may be used to indicate categories or types of messages that are ready to be accessed by a user. The visual indicators may also be used to indicate the currently active user profile or the identity of the user who is currently using the system. In some embodiments, the system may be configured to indicate the message types of waiting messages when the system is not actively interacting with a user and to indicate the currently active user profile when the device is conducting a speech dialog with the user.

In some embodiments, each visual indicator may be controllable to select one of multiple available colors. Each message type may be associated with a different color, and the indicators may be controlled to indicate the colors corresponding to the message types of any waiting messages. Colors may also be associated with different users and/or user profiles, and the color associated with the currently active user profile may be displayed when the corresponding user is engaging the system.

Figure 1:
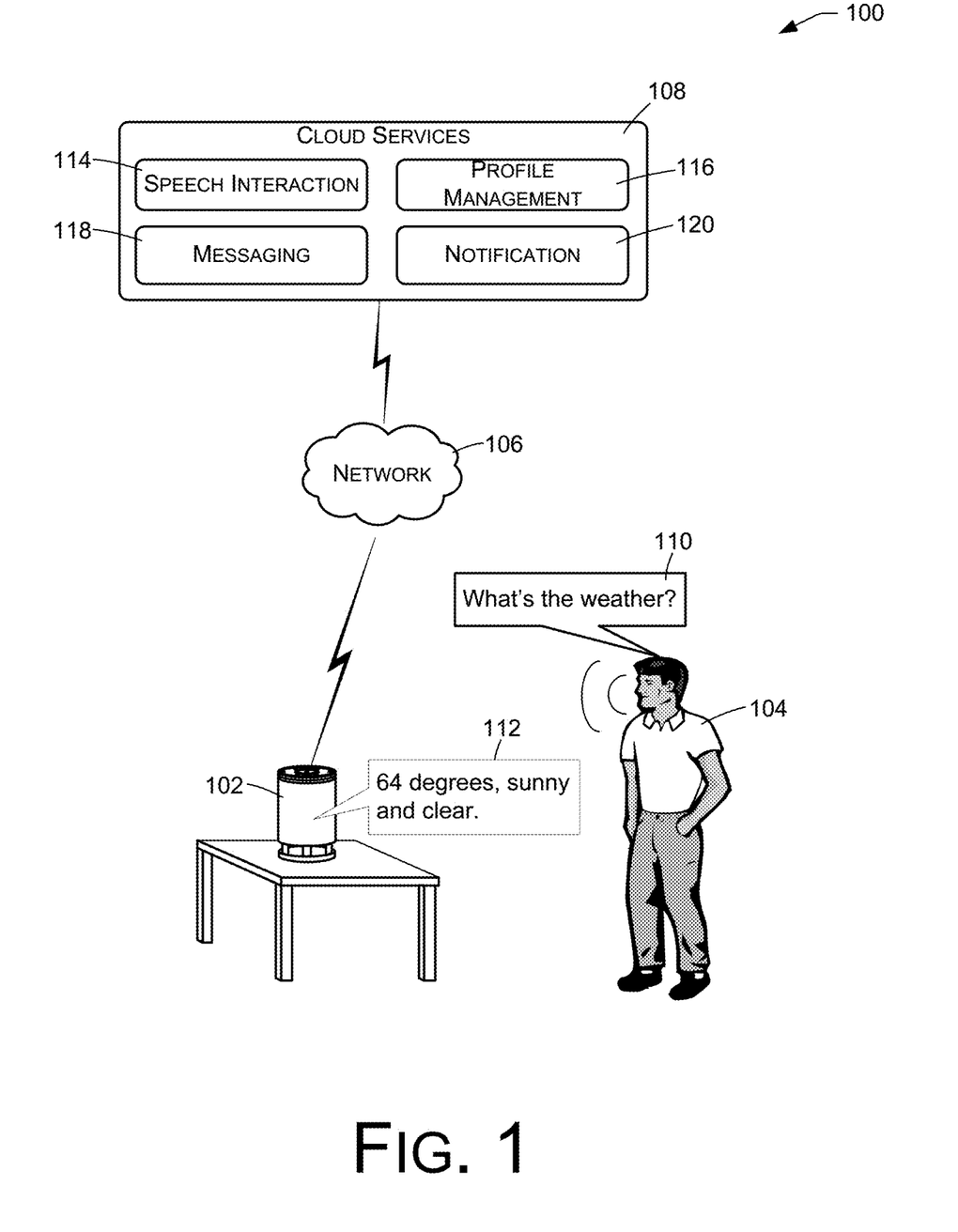
FIG. 1 shows an illustrative speech-based system comprising a speech interface device that works in conjunction with cloud-based services.

FIG. 1 shows an illustrative voice interaction computing system 100 that includes an electronic speech interface device 102 with which a user 104 may interact. In the illustrated implementation, the speech interface device 102 is positioned on a table within a room. In other implementations, it may be placed in any number of locations (e.g., ceiling, wall, in a lamp, beneath a table, under a chair, etc.). Furthermore, more than one speech interface device 102 may be positioned in a single room and different speech interface devices 102 may be positioned in different rooms of user premises.

The speech interface device 102 is configured to communicate through one or more networks 106 with network-based services 108, which are also referred to as cloud services 108. The speech interface device 102 captures and provides user speech to the cloud services 108. In addition, the speech interface device 102 receives generated speech from the cloud services 108 as well as instructions and other control information.

Generally, the speech interface device 102 operates under the direction and control of the cloud services 108. The cloud services 108 are configured to support and control numerous speech interface devices, which may be located remotely, in the homes and other premises of multiple users.

In FIG. 1, the user 104 is shown communicating with the cloud services 108 through the speech interface device 102. The user asks an audible question, "What's the weather?", as represented by the dialog bubble 110. In response, the system 100 may respond with generated speech as indicated by the dialog bubble 112. In this example, the response indicates, in response to the user's query, that the weather is "64 degrees, sunny and clear."

Functionally, the cloud services 108 may have a speech interaction service 114 that conducts speech dialogs with the user 104 using the speech interface device 102. The speech interaction service 114 receives one or more audio signals or streams from the speech interface device 102 and processes the audio signals or streams in various ways to determine the meaning of a user query and/or the intent expressed by the query. For example, speech interaction service 114 may implement automated speech recognition (ASR) to obtain a textual representation of user speech that occurs within the audio. The ASR may be followed by natural language understanding (NLU) to determine the intent expressed by the speech. The speech interaction service 114 may also have command execution functionality to compose and/or implement commands in fulfilment of determined user intent. Such commands may be performed by the cloud services 108 either independently or in conjunction with the speech interface device, such as by generating audio that is subsequently rendered by the speech interface device 102. In some cases, the cloud services 108 may generate a speech response, such as indicated by the dialog bubble 112, which may be sent to and rendered by the speech interface device 102.

The cloud services 108 may also include profile management services 116 that maintain multiple user profiles corresponding respectively to multiple users of the speech interface device 102. Each user profile may contain one or more of the following with respect to an individual user:

preferences of the user;
configurations for use when interacting with the user;
characteristics of the user;
settings for use when interacting with the user;
data sets that have been configured by the user;
data resources of the user and/or data resources associated with the user;
activity histories;
account information;
language models;
speech models;
security authorizations;
age of the user;
geographic location of the user;
permissions granted to the user;
user restrictions;
allowed activities;
operating modes;
security clearances or other security information; and
any other information relevant to interacting with and providing services for the user.

As more specific examples, a user profile may include shopping/purchase history of the user; lists such as contact lists, to-do lists, and shopping lists; account names and passwords; voice/speech models; media playlists; media libraries; calendars; social networking information; etc. A user profile may also indicate permissions or operating modes that are allowed for a user. For example, a user profile may indicate that the user is restricted to performing certain types of operations or accessing certain types of content. User profiles for children, for example, may restrict certain content or activities.

The speech interaction services 114 may be configured to determine or detect which of several users within the user premises are engaging the system at any time and to operate in the context of the current user's profile when interacting with and providing services for the user. For example, the current user's preferences and settings may be used when selecting services. As another example, personal user resources may be used when performing services for the user, such as personal media libraries, playlists, contact lists, etc. Furthermore, certain profile information such as activity history may be used to provide anticipatory services and/or to aid in disambiguating between possible user intents.

The cloud services 108 may also include a messaging service 118. The messaging service 118 receives messages of various types or categories from various sources and provides the messages to the user 104 through the speech interface device 102. Messages may include messages generated by the cloud services 108 and/or speech interface device 102 regarding system status, including error messages. Messages may also include voice messages created by users of the speech interface device 102. Messages may be received from other sources such as other network-based services or applications implemented by the cloud services. Generally, message types or categories may include one or more of the following:

system messages;
email;
text messages;
error messages;
voice messages;
event messages;
reminders;
service notifications such as weather alerts, package deliveries, order updates, school cancellations, etc.;
social networking messages, notifications, and/or status updates;
messages from different senders;
messages from different categories of senders, such as family members, non-family members, online services, vendors, etc.; and
any other categorization of messages.

The cloud services 108 may also implement a notification service 120 that works in conjunction with the speech interface device 102 to notify users regarding various information. More specifically, as will be described in more detail below, visual indicators of the speech interface device 102 may be used to indicate various types of information to the user 104, including the currently active user profile and the message types of messages that are awaiting acknowledgement by the user 104.

FIGS. 2-5 show features of an example speech interface device 102. In the illustrated embodiment, the speech interface device 102 comprises a cylindrical housing 202 having a circular top surface 204. A microphone array is formed by multiple input microphones or microphone elements 206 that are supported by or positioned on the top surface 204. One of the input microphones 206 is positioned at the center of the top surface 204. Other microphones 206 are arranged around the periphery of the top surface 204.

Figure 2:
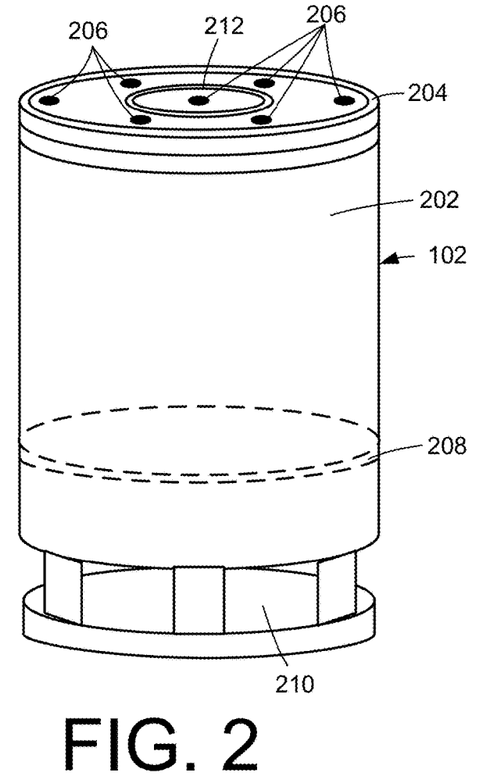
FIG. 2 is perspective view of an example speech interface device that may be used in the system of FIG. 1.

The speech interface device 102 may have a loudspeaker 208 that is supported or contained by the housing. The loudspeaker 208 may be positioned within and toward the bottom of the housing 202, and may be configured to emit sound omnidirectionally, in a 360 degree pattern around the speech interface device 102. For example, the loudspeaker 208 may comprise a round speaker element directed downwardly in the lower part of the housing 202, to radiate sound radially through an omnidirectional opening or gap 210 in the lower part of the housing 202.

The speech interface device 102 may have a visual display element 212 on the circular top surface 204 of the housing 202. In the illustrated embodiment, the display element 212 is ring-shaped and has multiple segments that can be individually activated and illuminated in different colors.

Figure 3:
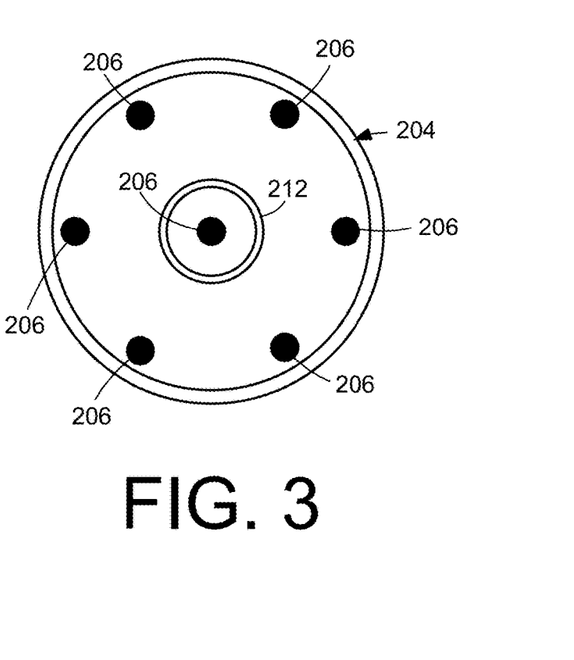
FIG. 3 is a top view of the example speech interface device of FIG. 3.

FIG. 3 shows the top surface 204 of the device 102 in more detail. The microphones 206 are positioned at the center and around the periphery of the circular top surface 204. The ring-shaped display element 212 is positioned concentrically in or on the top surface 204.

Figure 4:
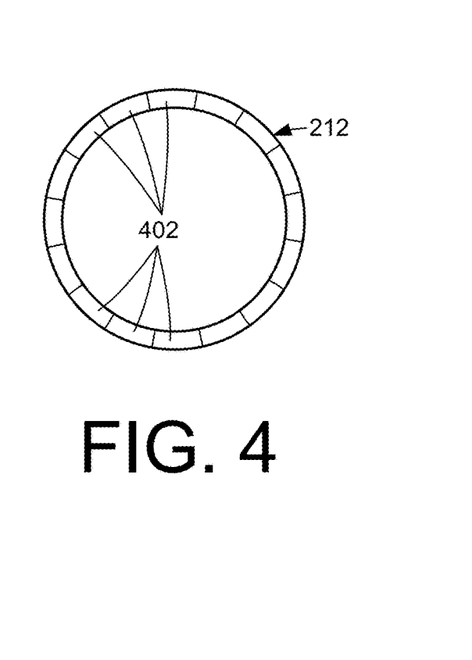
FIG. 4 is a top view of a display element such as may be positioned on the top of the example speech interface of FIG. 3.

FIG. 4 shows further details of the ring-shaped display element 212. The display element 212 comprises a plurality of elements or segments 402. Each element 402 may comprise a light-emitting diode (LED), a multi-color LED, any other form of solid-state light (SSL), or any other light or lighting element. Each of the elements or segments 402 can be individually illuminated. In addition, each segment 402 may be capable of displaying different colors, intensities, or temporal patterns. In a particular embodiment, the display element 212 may have 30 individual indicators, lights, illuminators, or segments, each of which may comprise an LED (light-emitting diode) or multi-color LED.

Figure 5:
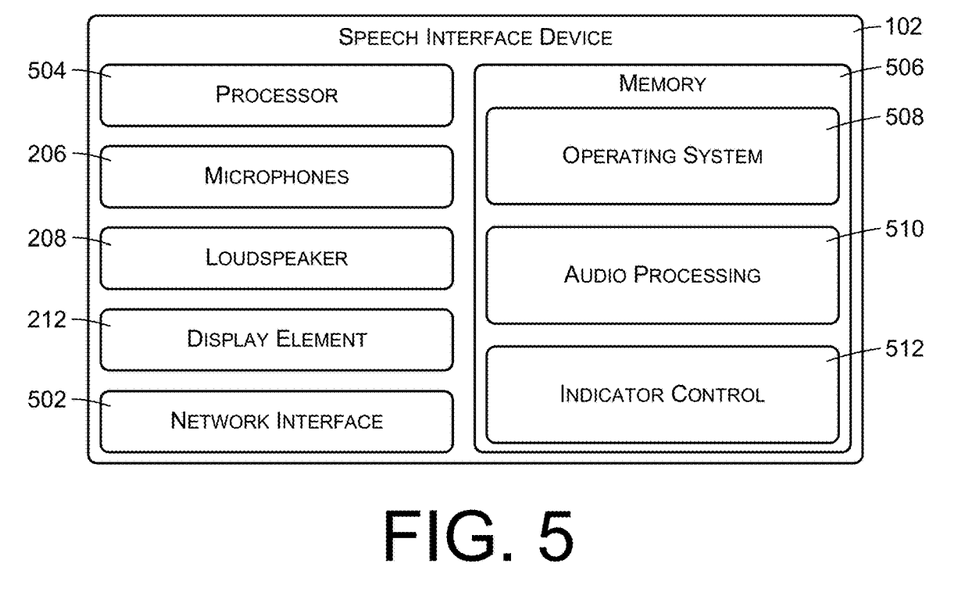
FIG. 5 is a block diagram showing example functional and logical components of the example speech interface device of FIG. 3.

FIG. 5 illustrates relevant logical or functional components of the example speech interface device 102. The speech-interface device 102 includes the microphones 206, loudspeaker 208, and display element 212 as described above. The speech interface device 102 may also have a network interface 502 such as a wireless local-area networking interface, an Ethernet interface, or any other communications interface allowing communications with the cloud services 108.

The speech interface device 102 has operational logic, which in many cases may comprise a processor 504 and memory 506. The processor 504 may include multiple processors and/or a processor having multiple cores. The memory 506 may contain applications and programs in the form of instructions that are executed by the processor 504 to perform acts or actions that implement desired functionality of the speech interface device 102, including the functionality specifically described herein. The memory 506 may be a type of computer storage media and may include volatile and nonvolatile memory. Thus, the memory 506 may include, but is not limited to, RAM, ROM, EEPROM, flash memory, or other memory technology.

The speech interface device 102 may have an operating system 508 that is executable to manage hardware and services within and coupled to the speech interface device 102. In addition, the speech interface device 102 may in some cases include audio processing components 510 for processing input audio signals generated by the microphones 206 and/or output audio signals provided to the loudspeaker 208.

The speech interface device 102 may have an indicator control component 512 that is configured to control the display element 212. The indicator control component 512 may be an executable module or code portion that is responsive to instructions received from the cloud services 108 to activate individual segments of the display element 212 in colors as specified by the cloud services 108.

The speech interface device 102 may include many other components, including other hardware and software components, that are not shown in FIG. 5.

The cloud services 108 may use the display element 212 in various ways, to indicate various types of information. For example, animations or patterns may be created by sequentially illuminating individual segments 402 to indicate various conditions or statuses. One or more of the segments 402 may also be illuminated using different colors to indicate the different conditions or statuses. For example, the display element 212 may in some cases be used to indicate a current operating mode of the system, such as a protected operating mode that is invoked when interacting with children to limit content and activities that are available.

In the embodiment described herein, individual segments 402 are used to indicate that one or more messages have been received and are awaiting access or acknowledgement by the user 104. The segments 402 are also used to indicate the user profile that is currently active.

In an example implementation, the messaging service 118 may receive and/or store messages of various types that can be played or accessed using the speech interface device 102. For example, a family member may interact with the speech interface device 102 through speech to create a message for another family member. As another example, the messaging service 118 may receive and store messages from various online services such as email services, shopping services, weather services, and so forth.

The notification service 120 may associate each type of message with a corresponding color. When a message is waiting to be heard, one or more of the indicator segments 402 may be illuminated with the color corresponding to the category of the waiting message. As an example, messages created locally by family members may be associated with the color green; messages relating to operation of the system 100 may be associated with the color yellow; messages from external senders, such as emails, text messages, or other types of messages may be indicated by the color blue; and so forth for various different types or categories of messages.

In some cases, patterns, sequences, and/or animations may be used to signal the presence and availability of messages and to differentiate between different types of messages. For example, certain types of messages may be indicated by a slowly flashing indicator while other types of messages are indicated by a rapidly flashing indicator. Animations or sequences using multiple segments or lights may also be used to indicate importance or urgency of messages. Animation or light sequences may be used in combination with colors to indicate both the type and the priority of one or more waiting messages.

When multiple types of messages are waiting and ready for playback or acknowledgement, multiple indicator segments 402 may be illuminated in the different colors corresponding to the different types of the multiple messages.

A user may interact with the speech interface device 102 to request playback of messages corresponding to a stated message type. For example, a user may request to hear all messages of the type "delivery notifications." As another example, a user may request to hear all message of the type "family messages." As messages of certain types are listened to or acknowledged, the corresponding indicator segments may be extinguished.

The indicator segments 402 may also be used when the user 104 is engaging the system 100 and/or when the speech interaction service 114 is conducting a speech dialog with the user 104, to indicate the currently active user profile. More specifically, the notification service 120 may associate each user and user profile with a different color. When a particular user 104 is engaging the system 100, one or more of the indicator segments 402 may be illuminated in the color corresponding to the currently active user profile, thereby confirming to the user that he or she has been correctly identified by the system 100.

In some cases, patterns, sequences, and/or animations may be used to indicate the active user profile. For example, one user profile may be indicated by a slowly flashing indicator while another user profile may be indicated by a rapidly flashing indicator. Animations or sequences using multiple segments or lights may also be used to indicate different user profiles. Animation or light sequences may be used in combination with colors to indicate different user profiles. In some embodiments, the user may be given the opportunity to select a custom animation for his or her own profile.

In some embodiments, the display element 212 may be used to indicate the current user or user profile only when the system 100 is actively engaging the user 104 in a speech dialog or when the system 100 is providing services (such as music playback) for a particular user. Similarly, in some embodiments the display element 212 may be used to indicate the types of waiting message only when the system 100 is not actively engaging the user and/or is not providing services for a particular user. In some embodiments, the display element 212 may be used to indicate types of waiting messages when none of the potential users are engaging the system 100 and to indicate the currently active user profile when a user is engaging the system 100.

Figure 6:
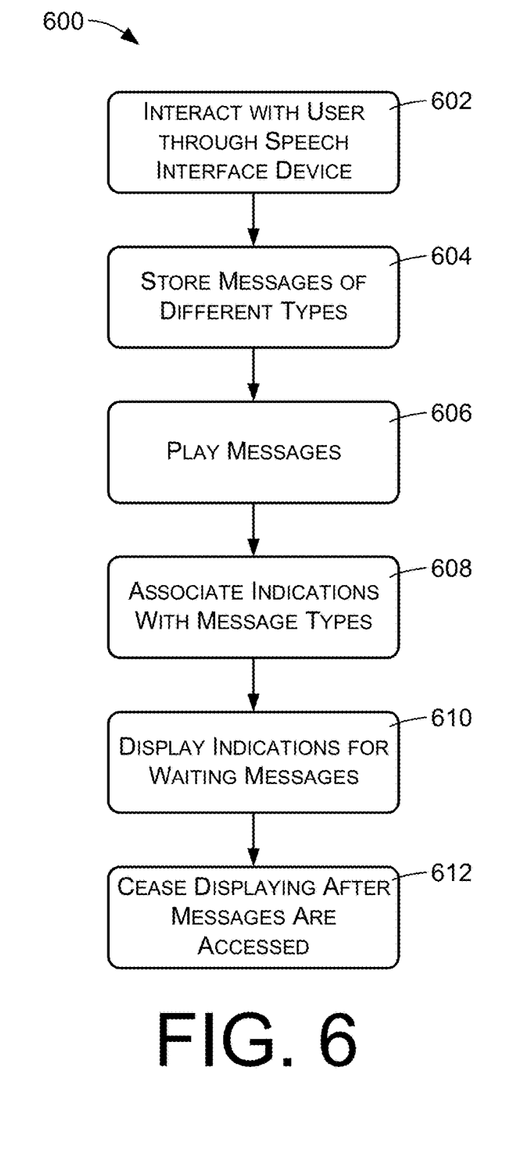
FIGS. 6-10 are flow diagrams illustrating examples methods that may be implemented by the system of FIG. 1.

FIG. 6 illustrates an example method 600 of notifying users of message types corresponding to messages that are awaiting access by the users. An action 602 comprises interacting with a user by speech through a speech interface device. An action 604 comprises generating, receiving, and/or storing messages of different message types. An action 606 comprises playing the messages on the speech interface device in response to requests by a user.

An action 608 comprises associating one of multiple visual indications with each message type. In the described embodiment, the visual indications may be produced using individual segments or combinations of segments 402 of the display element 222. In some embodiments, the visual indications may comprise different colors, wherein an individual color is associated with each different messages type. The visual indications may also, or alternatively, comprise temporal patterns or sequences created using one or more individual segments of a display element. Each different visual indication may comprise one or more of:

different colors produced by one or more lights of a multi-segment or multi-light display element;

different sequences of one or more lights of the display element;

different patterns of one or more lights of the display element;

different animations produced by one or more lights of the display element.

An action 610 comprises causing the speech interface device to display the visual indication associated with the message type of one of the stored messages to indicate the availability of the stored message. The action 610 may further comprise causing the speech interface device to concurrently display the visual indications associated with the message types of multiple ones of the stored messages to indicate availability of different types of messages.

An action 612 comprises causing the speech interface device to cease to display the visual indication after the corresponding stored message is accessed by the user, such as when the user listens to the message.

Figure 7:
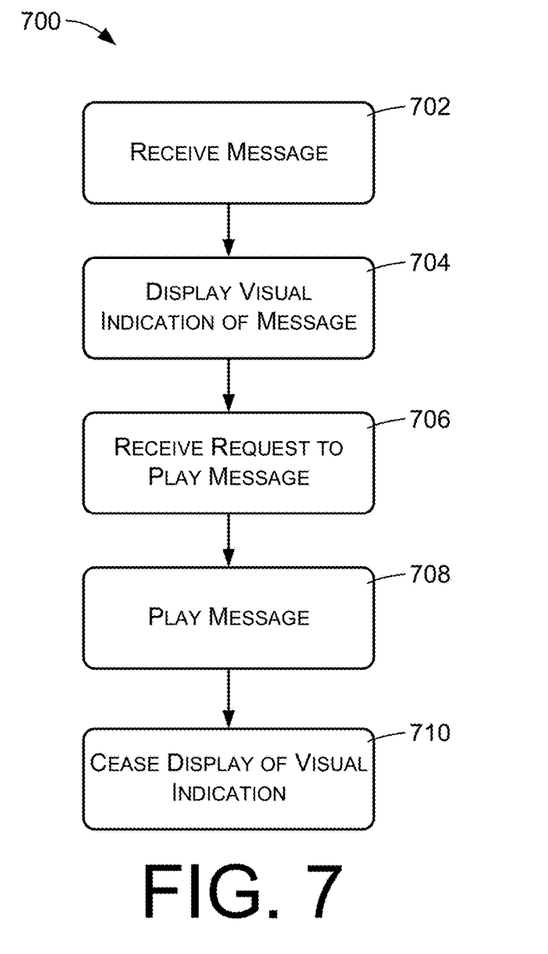

FIG. 7 illustrates an example method of interacting with a user to notify the user of received messages and to play the messages for the user. An action 702 comprises receiving a message. The message may be a voice message, which may contain a recorded voice or a synthesized voice. The message may have one of multiple message types as described above.

An action 704 comprises causing a speech interface device to display the visual indication that has been associated with the message type of the received message, to indicate availability of the received message to the user. The action 704 may be performed in conjunction with a multi-segment or multiple-light array such as an LED array. A light array may comprise individual lights or elements, each of which may be illuminated in a different color. In some embodiment, the action 704 may be performing by controlling a single light or element that is capable of displaying different colors. In other embodiments, the action 704 may be performed by controlling individual lights or LEDs of a light array or LED array.

An action 706 comprises receiving a request to play the message. The action 706 may be performed by interacting with the user using speech through a speech interface device. In some cases, the user may request to hear messages of a particular message type, such as messages of the type that are currently indicated by the visual indication.

An action 708 comprises playing the received message in response to receiving the request from the user. An action 710 comprises causing the speech interface device to cease to display the visual indication associated with the message type of the received message upon playing the received message.

Figure 8:
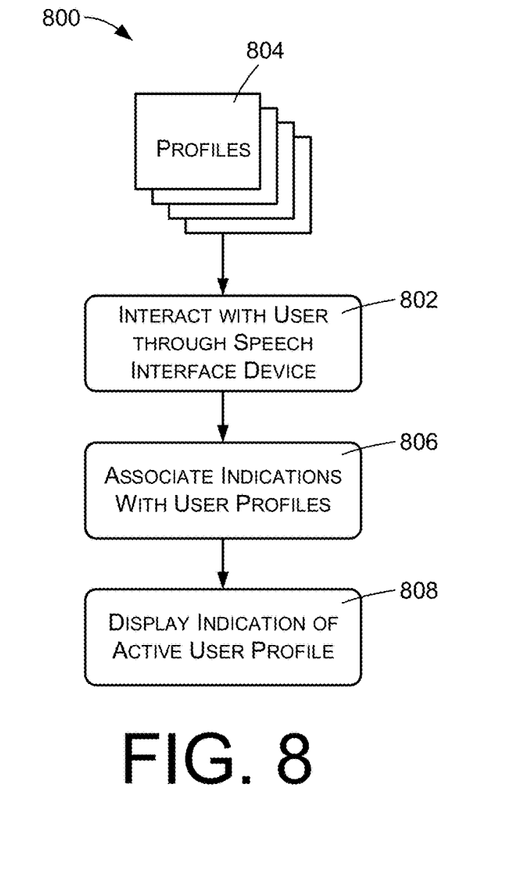

FIG. 8 illustrates an example method 800 of notifying users regarding currently active user profiles. An action 802 comprises interacting with a user by speech through a speech interface device in accordance with an active one of multiple user profiles 804 that correspond respectively to individual users. Each user profile may contain or specify information and/or data associated with the corresponding user, which may be used to tailor a user's experience when using a speech-based system.

An action 806 comprises associating one of multiple visual indications with each user profile 804. In some embodiments, the visual indications may comprise different colors, wherein an individual color is associated with each different user or user profile 804. The visual indications may also, or alternatively, comprise temporal patterns or sequences created using one or more individual segments of a display element. As example, each different visual indication may comprise one or more of:

different colors produced by one or more lights of a multi-segment or multi-light display element;

different sequences of one or more lights of the display element;

different patterns of one or more lights of the display element;

different animations produced by one or more lights of the display element.

An action 808 comprises causing the speech interface device to display the visual indication associated with the currently active user profile 804.

Figure 9:
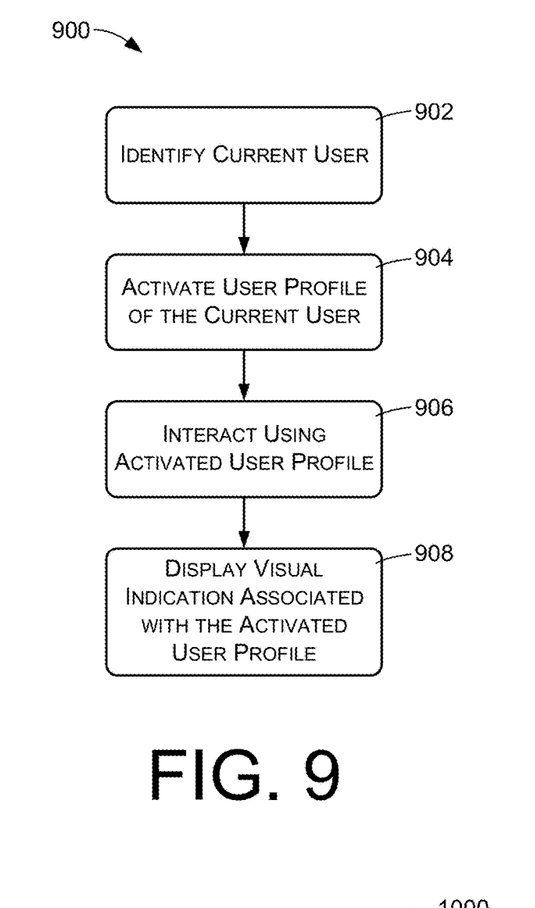

FIG. 9 illustrates an example method of interacting with a user and concurrently providing an indication of the currently active user profile. An action 902 comprises identifying a current user of the speech interface device. Some embodiments may use voice identification to identify a use who is currently speaking. In other embodiments, a user may identify himself or herself to the system, such as by speaking his or her name. In other embodiments, a user may explicitly request that the system use a certain user profile.

An action 904 comprises activating a user profile that is associated with the identified user. An action 906 comprises interacting with the user using speech through the speech interface device in accordance with the activated user profile.

An action 906 comprises causing the speech interface device to display the visual indication that has been associated with the activated user profile to confirm the activation of the user profile.

The method of FIG. 9 may be repeated with different users. For example, the method 900 may be performed with a first user to display a first visual indication associated with the user profile of the first user. The method may then be performed upon use of the system by a second user to display a second visual indication associated with the user profile of the second user.

Figure 10:
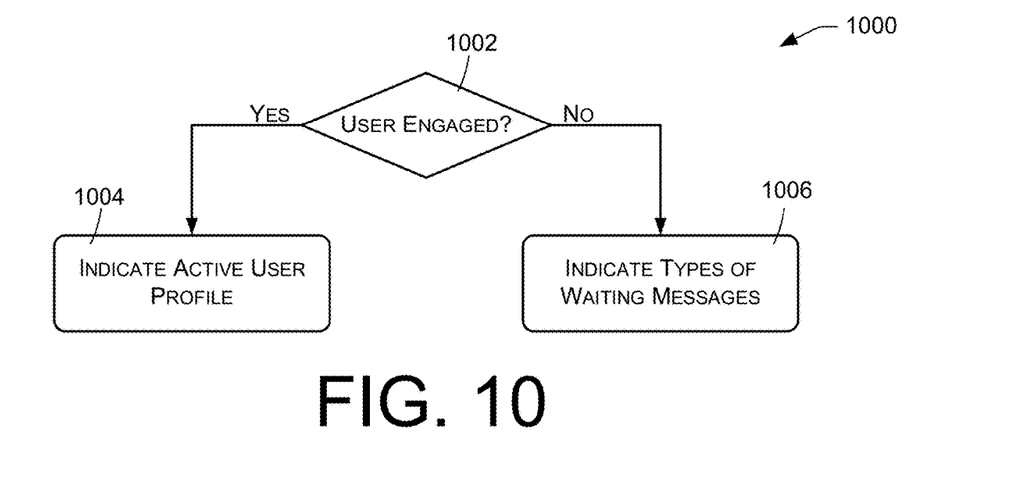

FIG. 10 illustrates an example method 1000 that may be performed in certain embodiments. An action 1002 comprises ascertaining whether a user is currently engaging with a speech interaction system, such as whether the system is currently conducting a speech dialog with a user or whether the system is actively providing services for the user. If the user is currently engaging the system, or the system is actively providing services for the user, an action 1004 is performed of indicating the current user profile, using the methods of FIGS. 8 and 9. If no user is currently engaging the system and the system is not actively providing services for the user, an action 1006 is performed of indicating the messages types of any waiting messages, using the methods of FIGS. 6 and 7.

The example methods described above may be performed by cloud-based or network-based service such as described above, which may comprise multiple computer servers that communicate with the speech interface device through a wide-area communications network such as the Internet. Alternatively, the example methods may be performed by the speech interface device or by any other component working in conjunction with the speech interface device.

Multiple speech interfaces may be located within a single home or other premises. Such multiple speech interfaces may be configured as a group to display the same visual indications. Alternatively, one or more speech interfaces may be configured to operate independently of other speech interface devices and may therefore display different visual indications than the other speech interface devices.

Figure 11:
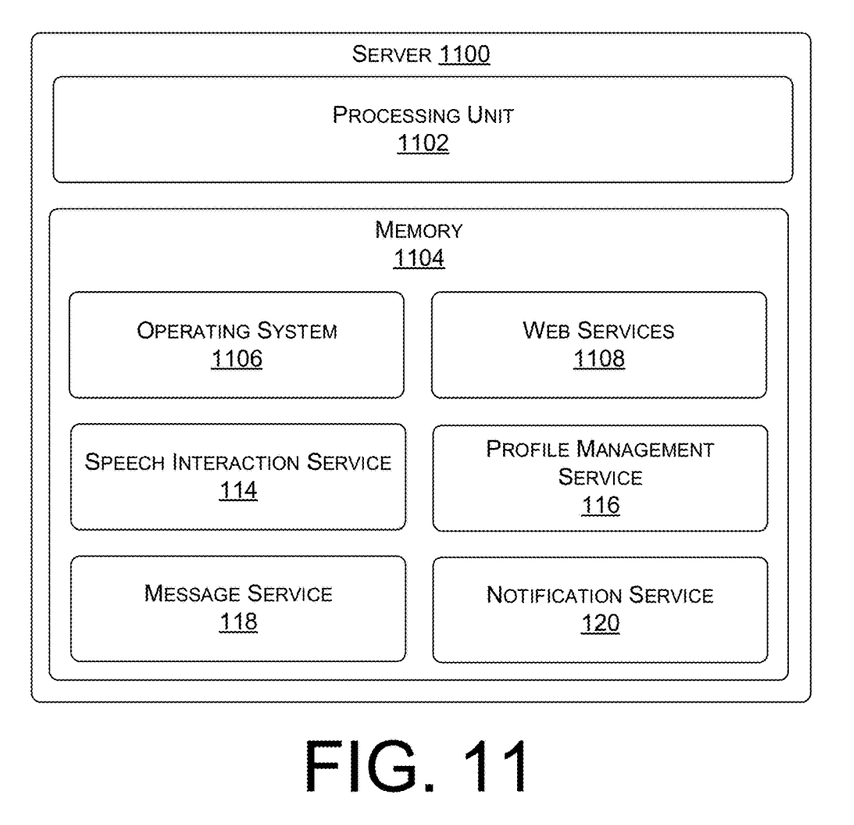
FIG. 11 is a block diagram of an example server such as may be used to implement the cloud services of FIG. 1.

FIG. 11 illustrates relevant components of a server 1100 that may be used to implement the cloud services 108. Generally, functional elements of the cloud services 108, such as the speech interaction service 114, the profile management service 116, the messaging service 118, and the notification service 120 may be implemented by one or more servers, with the various functionality described above distributed in various ways across the different servers. Servers may be located together or separately, and organized as virtual servers, server banks, and/or server farms. The functionality described herein may be provided by the servers of a single entity or enterprise, or may utilize the servers and/or services of multiple entities or enterprises.

In a very basic configuration, an example server 1100 may comprise a processing unit 1102 having one or more processors and associated memory 1104. The memory 1104 may be a type of computer storage media and may include volatile and nonvolatile memory. Thus, the memory 1104 may include, but is not limited to, RAM, ROM, EEPROM, flash memory, or other memory technology.

The memory 1104 may be used to store any number of functional components that are executable by the processing unit 1102. In many embodiments, these functional components comprise instructions or programs that are executable by the processing unit 1102, and that when executed implement operational logic for performing the actions described herein.

Functional components stored in the memory 1104 may include an operating system 1106 and a web service component 1108 that interacts with remote devices such as computers, media consumption devices, and so forth. The memory 1104 may also have instructions implementing the speech interaction service 114, the profile management service 116, the messaging service 118, and the notification service 120.

The server 1100 may of course include many other logical, programmatic, and physical components that are not shown in FIG. 11, including additional hardware components such as network interfaces, user interface devices, power components, and so forth.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A system, comprising:
one or more processors; and
one or more computer-readable media storing instructions that, when executed by the one or more processors, cause the one or more processors to perform operations comprising:
receiving, from a speech interface device, first audio data representing first user speech;
determining, based at least in part on the first audio data, that the speech interface device is engaged in an active dialog with a first user profile;
generating first data in accordance with the first user profile;
sending, based at least in part on determining that the speech interface device is engaged in the active dialog with the first user profile, the first data to the speech interface device, the first data causing the speech interface device to output an indication of presence associated with the first user profile;
determining, after sending the first data to the speech interface device, that the active dialog by the speech interface device with the first user profile has ceased; and
causing the indication to cease being output based at least in part on determining that the active dialog by the speech interface device with the first user profile has ceased.

2. The system of claim 1, the operations further comprising:
determining intent data based at least in part on the first audio data, the intent data corresponding to a request to play content through the speech interface device,
wherein the first data causes the speech interface device to play content associated with a message.

3. The system of claim 2, wherein the content comprises at least one of:
an identifier of the message; or
the message.

4. The system of claim 1, the operations further comprising:
receiving, from the speech interface device, second audio data representing second user speech;

identifying, based at least in part on the second audio data, a second user profile;
generating second data in accordance with the second user profile; and
sending the second data to the speech interface device.

5. The system of claim 4, the operations further comprising:
determining intent data based at least in part on the first audio data, the intent data corresponding to a request to play one or more messages through the speech interface device; and
selecting a message from multiple available messages based at least in part on the message being associated with the first user profile.

6. The system of claim 4, the operations further comprising:
determining intent data based at least in part on the first audio data, the intent data corresponding to a command,
wherein the first data causes the speech interface device to output first generated speech in conjunction with performing the command; and
determining the intent data based at least in part on the second audio data,
wherein the second data causes the speech interface device to output second generated speech in conjunction with performing the command for a second time, the second generated speech different from the first generated speech.

7. The system of claim 1, wherein causing the speech interface device to output the indication comprises causing the speech interface device to display a first visual indication associated with a message.

8. The system of claim 1, wherein the identifying the first user profile comprises activating the first user profile, the operations further comprising, after the sending the first data to the speech interface device:
determining that no users are currently engaging the system via the speech interface device; and
deactivating the first user profile.

9. A computer-implemented method, comprising:
receiving, based at least in part on first user speech captured by a speech interface device, first audio data representing the first user speech;
determining, based at least in part on the first audio data, that the speech interface device is engaged in an active dialog with a first user profile;
generating first data in accordance with the first user profile;
sending, based at least in part on determining that the speech interface device is engaged in the active dialog with the first user profile, the first data to the speech interface device, the first data causing the speech interface device to output an indication of presence associated with the first user profile;
determining, after sending the first data to the speech interface device, that the active dialog by the speech interface device with the first user profile has ceased; and
causing the indication to cease being output based at least in part on determining that the active dialog by the speech interface device with the first user profile has ceased.

10. The computer-implemented method of claim 9, further comprising:
processing the first audio data to determine intent data, the intent data corresponding to a request to play content through the speech interface device,
wherein the first data causes the speech interface device to play first content associated with a message.

11. The computer-implemented method of claim 10, wherein the first content comprises at least one of:
an identifier of the message; or
the message.

12. The computer-implemented method of claim 9, further comprising:
receiving, based at least in part on second user speech captured by the speech interface device, second audio data representing the second user speech;
identifying, based at least in part on the second audio data, a second user profile;
generating second data in accordance with the second user profile; and
sending the second data to the speech interface device.

13. The computer-implemented method of claim 12, further comprising:
processing the first audio data to determine intent data, the intent data corresponding to a request to play a message through the speech interface device; and
causing the speech interface device to play the message.

14. The computer-implemented method of claim 12, further comprising:
processing the first audio data to determine intent data, the intent data corresponding to a user query,
wherein the first data causes the speech interface device to output first generated speech associated with the first user profile, the first generated speech being responsive to the user query; and
processing the second audio data to determine the intent data corresponding to a same user query as the user query,
wherein the second data causes the speech interface device to output second generated speech associated with the second user profile, the second generated speech being responsive to the same user query and different from the first generated speech.

15. The computer-implemented method of claim 9, further comprising:
activating the first user profile in response to identifying the first user profile; and
deactivating the first user profile based at least in part on determining that no users are currently engaging the speech interface device.

16. A system, comprising:
one or more processors; and
one or more computer-readable media storing instructions that, when executed by the one or more processors, cause the one or more processors to perform operations comprising:
processing first audio data representing first user speech captured by a speech interface device;
determining, based at least in part on the processing of the first audio data, that the speech interface device is engaged in an active dialog with a first user profile;
generating first data in accordance with the first user profile;
sending, based at least in part on determining that the speech interface device is engaged in the active dialog with the first user profile, the first data to the speech interface device, the first data causing the speech interface device to output an indication of presence associated with the first user profile;

determining, after sending the first data to the speech interface device, that the active dialog has ceased; and causing the indication to cease being output based at least in part on determining that the active dialog has ceased.

17. The system of claim 16, the operations further comprising:

processing second audio data representing second user speech captured by the speech interface device;

identifying, based at least in part on the processing of the second audio data, a second user profile;

generating second data in accordance with the second user profile; and sending the second data to the speech interface device.

18. The system of claim 17, the operations further comprising:

determining intent data based at least in part on the processing of the first audio data, the intent data corresponding to a request to play one or more messages via the speech interface device, wherein the first data causes the speech interface device to play a first message associated with the first user profile; and determining the intent data based at least in part on the processing of the second audio data, wherein the second data causes the speech interface device to play a second message associated with the second user profile, the second message different from the first message.

19. The system of claim 17, the operations further comprising:

determining intent data based at least in part on the processing of the first audio data, the intent data corresponding to a request to play music via the speech interface device;

causing the speech interface device to play first music from a first media playlist associated with the first user profile; and determining the intent data based at least in part on the processing of the second audio data, wherein the second data causes the speech interface device to play second music from a second media playlist associated with the second user profile.

20. The system of claim 16, wherein causing the speech interface device to output the indication comprises causing the speech interface device to display a first visual indication associated with a message.

\* \* \* \* \*